No. 680,835. Patented Aug. 20, 1901.
J. A. BEAMISDERFER.
NUT LOCK.
(Application filed July 5, 1900.)
(No Model.)
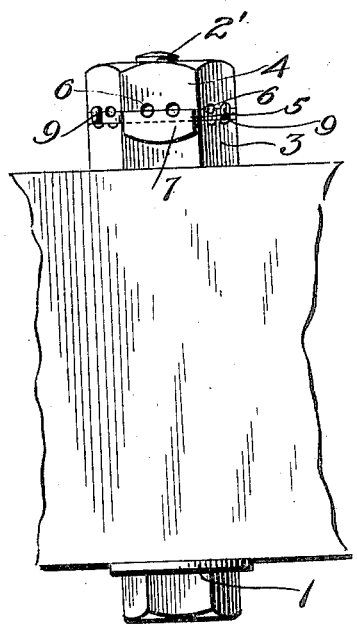
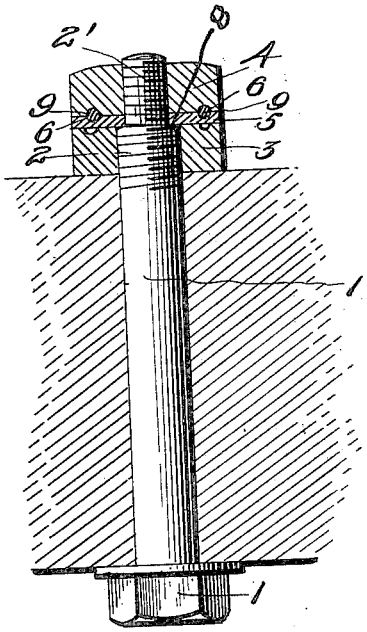
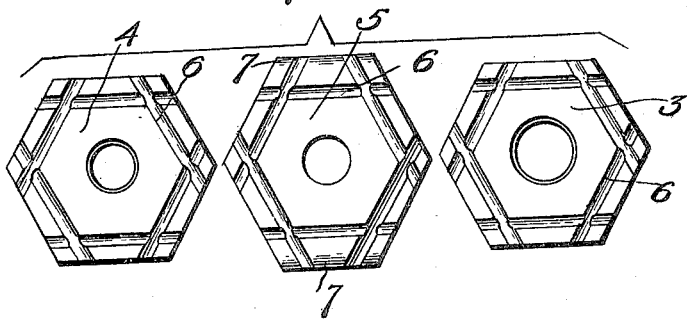
Inventor
J. A. Beamisderfer
Witnesses
by
Attorneys
THE NORRIS PETERS CO., PHOTO-LITHO., WASHINGTON, D. C.

UNITED STATES PATENT OFFICE.

JOSEPH A. BEAMISDERFER, OF PALMYRA, PENNSYLVANIA.

NUT-LOCK.

SPECIFICATION forming part of Letters Patent No. 680,835, dated August 20, 1901.

Application filed July 5, 1900. Serial No. 22,562. (No model.)

*To all whom it may concern:*

Be it known that I, JOSEPH A. BEAMISDERFER, a citizen of the United States, residing at Palmyra, in the county of Lebanon and State of Pennsylvania, have invented certain new and useful Improvements in Nut-Locks; and I do declare the following to be a full, clear, and exact description of the invention, such as will enable others skilled in the art to which it appertains to make and use the same.

My invention relates to improvements in nut-locks, and has for its object to provide a simple construction whereby a safe and secure locking connection between the bolt and nuts is effected.

With this object in view the invention consists in certain features of construction and combination of parts, which will be hereinafter fully set forth.

In the accompanying drawings, Figure 1 is a side view of a bolt and coöperating parts embodying my invention. Fig. 2 is a longitudinal section. Fig. 3 is a detail view showing the coöperating grooved faces of the nuts and lock-washer.

Referring now more particularly to the drawings, wherein like reference characters designate corresponding parts throughout the several views, the numeral 1 designates the bolt, provided in accordance with my invention with right and left threaded portions 2 and 2' of different diameters.

3 and 4 designate nuts, and 5 an intermediate locking-washer arranged upon the bolt. The nut 3 is threaded to engage the larger right-hand threaded portion 2 of the bolt and is adapted to bear directly against the object to be clamped.

The numeral 5 indicates an interchangeable washer, the opening of which fits over the smaller screw-threaded end of the bolt and rests on the nut 3 and also on a surrounding shoulder 8, formed by the intersection of the two threads 2 and 2' of the bolt. The nut 4 is threaded to engage the smaller left-hand threaded portion or extremity of the shank of the bolt and acts as a safety-nut to prevent retrograde rotation of the nut 3, as hereinafter set forth.

The top or outer face of the nut 3, the base or inner face of the nut 4, and the outer face of the washer 5 are provided with matching key-seats, comprising grooves 6, and the washer is further provided at diametrically opposite sides with flanges 7, adapted to engage opposite sides of the nut 3 to hold it (the washer) from turning independent of said nut. The nuts and washer are hexagonal in form, and the grooves 6 extend parallel with the sides thereof, and consequently intersect each other, by which arrangement a series of diagonal key-seats are provided to receive one or more keys 9. These keys may be of any approved form, and may consist simply of wire nails bent to prevent casual disengagement of the same from the grooves. The grooves in the nut 3 may be dispensed with, if desired, as they are not essential; but it is important to have the key-seats formed between the outer nut 4 and the washer. It will be seen that the arrangement of the grooves is such that the insertion of a key or keys may be easily effected even where the parts are more or less inclosed or concealed, as a seat is exposed on each side.

From the foregoing description, taken in connection with the accompanying drawings, the construction and mode of operation of the invention will be readily understood, and it will be seen that a simple, safe, and secure nut-lock is provided.

Changes in the form, proportion, and minor details of construction may be made within the scope of the invention without departing from the spirit or sacrificing any of the advantages thereof.

Having thus fully described my invention, what I claim as new and useful, and desire to secure by Letters Patent of the United States, is—

In a nut-lock the combination with the bolt having a right and left screw-threaded end of different diameters, of the nuts adapted to engage said threaded end, the nuts being provided with semicircular grooves crossing and intersecting each other, and an interchangeable washer having grooves on its opposite sides formed and arranged the same as those of the nuts, whereby the grooves of the nuts and washer form circular openings to permit of a locking-key therein, the washer being also provided with flanges to engage either of the nuts, as may be required, substantially as specified.

In testimony whereof I have hereunto set my hand in presence of two subscribing witnesses.

JOSEPH A. BEAMISDERFER.

Witnesses:
H. M. ZERBE,
J. G. STAUFFER.